United States Patent
Wang (10) Patent No.: US 11,569,919 B2
(45) Date of Patent: Jan. 31, 2023

(54) QUANTUM TOMOGRAPHY AND PHOTON SOURCE OPTIMIZATION

(71) Applicant: Psiquantum, Corp., Palo Alto, CA (US)

(72) Inventor: Albert Wang, Sunnyvale, CA (US)

(73) Assignee: PSIQUANTUM, CORP., Palo Alto, CA (US)

( * ) Notice: Subject to any disclaimer, the term of this patent is extended or adjusted under 35 U.S.C. 154(b) by 0 days.

(21) Appl. No.: 17/351,101

(22) Filed: Jun. 17, 2021

(65) Prior Publication Data

US 2022/0014277 A1     Jan. 13, 2022

Related U.S. Application Data (60) Provisional application No. 63/042,405, filed on Jun. 22, 2020.

(51) Int. Cl.
*G06N 10/00* (2022.01)
*H04B 10/70* (2013.01)

(52) U.S. Cl.
CPC ............ *H04B 10/70* (2013.01); *G06N 10/00* (2019.01)

(58) Field of Classification Search
CPC ................................. H04B 10/70; G06N 10/00
See application file for complete search history.

(56) References Cited

U.S. PATENT DOCUMENTS

| 7,242,774 | B1 * | 7/2007 | Elliott | H04L 9/0852 |
| | | | | 356/73.1 |
| 7,245,829 | B1 * | 7/2007 | Sindile | H04J 14/0246 |
| | | | | 398/91 |
| 2001/0010036 | A1 | 7/2001 | Stewart et al. | |
| 2006/0164706 | A1 | 7/2006 | Pittman et al. | |

FOREIGN PATENT DOCUMENTS

| WO | WO-2008015758 A1 * | 2/2008 | ............. H04B 10/70 |
| WO | WO-2009155486 A1 * | 12/2009 | ........... H04L 9/0855 |

OTHER PUBLICATIONS

Caspani, et al., "Integrated Sources of Photon Quantum States Based on Nonlinear Optics", Light: Science & Applications, vol. 6, Jun. 6, 2017, 12 pages.

(Continued)

*Primary Examiner* — Li Wu Chang
(74) *Attorney, Agent, or Firm* — Kilpatrick Townsend & Stockton LLP (57) ABSTRACT

A photon source module includes a plurality of photon sources, wherein each photon source is configured to non-deterministically generate one or more non-entangled or entangled photons in response to receiving a trigger signal. When two or more photon sources simultaneously generate photons in response to a trigger signal, one photon of a first photon pair is directed to a photon processing system and one photon of a second photon pair is directed to a photon analyzer. During repetitive operation, the photon analyzer analyzes photons from each of the plurality of photon sources to determine characteristics of each photon source and can use that information to direct the highest quality photons to the photon processing system.

20 Claims, 7 Drawing Sheets

(56) References Cited

OTHER PUBLICATIONS

Kaneda, et al., "High-Efficiency Single-photon Generation Via Large-scale Active Time Multiplexing", Science Advances, vol. 5, Oct. 4, 2019, 6 pages.
PCT/US2021/038245, "International Search Report and Written Opinion", dated Oct. 14, 2021, 9 pages.
Zhang, et al., "Generation of Multiphoton Quantum States on Silicon", Light: Science & Applications, vol. 8, Issue 41, May 1, 2019, 7 pages.

* cited by examiner

QUANTUM TOMOGRAPHY AND PHOTON SOURCE OPTIMIZATION

CROSS-REFERENCES TO OTHER APPLICATIONS

This application claims priority to U.S. Provisional Patent Application No. 63/042,405, filed on Jun. 22, 2020 which is hereby incorporated by reference in entirety for all purposes.

FIELD

The described embodiments relate generally to quantum computing. More particularly, the present embodiments relate to the characterization of photon sources and photons generated by the photon sources.

BACKGROUND

Photon sources can be used in many different photonic quantum technologies, where an ideal photon source would generate photons deterministically. Such photon sources can be made from a plurality of spatially or temporally multiplexed photon sources that are coherently coupled to approach a probability of one for each photon generation "cycle". During operation of the photon sources it would be beneficial to monitor the quality of the photons generated by each individual photon source and to monitor the quality of each photon source to optimize the performance of the system.

SUMMARY

In some embodiments a quantum computing system comprises a photon processing system, a photon analyzer and a photon source module coupled to the photon processing system and to the photon analyzer. The photon source module includes at least one photon source configured to discharge one or more photons per trigger signal and a photon multiplexer configured to direct the one or more discharged photons to the photon processing system or to the photon analyzer. In various embodiments the photon multiplexer directs the one or more discharged photons to the photon processing system when the photon source module discharges one photon per trigger signal.

In some embodiments the photon multiplexer directs one of the one or more discharged photons to the photon analyzer when the photon source module discharges two or more photons per trigger signal. In various embodiments the photon processing system is a resource state generator. In some embodiments the one or more photons are photons in an entangled state. In some embodiments the at least one photon source is a plurality of spatially multiplexed photon sources. In various embodiments the at least one photon source is a plurality of temporally multiplexed photon sources.

In some embodiments a quantum computing system comprises a first photon source configured to generate one or more first photons, a second photon source configured to generate one or more second photons and a photon multiplexer configured to direct one of the one or more first photons or one of the one or more second photons to a photon analyzer when the first photon source and the second photon source simultaneously generate photons. In various embodiments a device comprises a first photon source configured to generate first photon pairs where each first photon pair includes a first signal photon and a first herald photon. A second photon source is configured to generate second photon pairs wherein each second photon pair includes a second signal photon and a second herald photon. A first detector is configured to generate a first detection signal in response to detecting the first herald photon. A second detector is configured to generate a second detection signal in response to detecting the second herald photon. Detection logic circuitry is configured to direct one of the first or the second signal photons to a photon analyzer and one of the first or the second signal photons to a photon processing system in response to the detection logic circuitry receiving the first and the second detection signals.

In some embodiments the device further comprises a multiplexer that routes the one of the first or the second signal photons to the photon analyzer and the one of the first or the second signal photons to the photon processing system in response to receiving one or more signals from the detection logic circuitry. In various embodiments the detection logic circuitry directs the first and the second signal photons based on a quality level of each of the first and the second signal photons. In some embodiments in response to receiving the first or the second signal photon, the photon analyzer determines one or more characteristics of the received signal photon.

In some embodiments the one or more characteristics include color, jitter, wavelength, spectral width or dispersion. In various embodiments during repetitive operation of the first and the second photon sources, the photon analyzer determines one or more characteristics of first signal photons generated by the first photon source and one or more characteristics of second signal photons generated by the second photon source.

In some embodiments the photon analyzer compares one or more characteristics of the first signal photons with one or more characteristics of the second signal photons. In various embodiments in response to the comparing, the photon analyzer transmits instructions causing the photon processing system to receive more first signal photons than second signal photons. In some embodiments the device further comprises a crossover switch that redirects signal photons routed to the photon analyzer by the multiplexer to the photon processing system.

In some embodiments a method of generating photons comprises generating a first photon pair with a first photon source, the first photon pair including a first signal photon and a first herald photon. Generating a second photon pair with a second photon source, the second photon pair including a second signal photon and a second herald photon. Generating a first detection signal in response to detecting the first herald photon and generating a second detection signal in response to detecting the second herald photon. One of the first or the second signal photons are routed to a photon analyzer and one of the first or the second signal photons are routed to a photon processing system in response to detection logic circuitry receiving the first and the second detection signals.

In some embodiments the routing is performed by a multiplexer that is controlled by the detection logic circuitry. In various embodiments the detection logic circuitry directs the multiplexer to route first and the second signal photons based on a quality level of each of the first and the second signal photons. In some embodiments in response to receiving first or the second signal photon, the photon analyzer determines one or more characteristics of the received signal photon. In various embodiments the one or more characteristics include color, jitter, wavelength, spectral width or dispersion. In some embodiments during repetitive operation of the first and the second photon sources, the photon analyzer determines one or more characteristics of the first signal photon and one or more characteristics of the second signal photon. In various embodiments in response to the determining one or more characteristics of the first and the second signal photons, the photon analyzer transmits instructions causing the photon processing system to receive more first signal photons than second signal photons.

In some embodiments a photon source comprises a plurality of photon sources, each configured to non-deterministically generate a photon pair in response to receiving a trigger signal, wherein each photon pair includes a signal photon and an herald photon. A plurality of photon detectors are each coupled to a respective photon source of the plurality of photon sources and configured to generate a respective detection signal upon detecting the herald photon of each generated photon pair. A plurality of photon routing switches are each coupled to a respective photon source and configured to direct the respective signal photons to a photon processing system or to a photon analyzer. A photon detection logic circuit is configured to receive each respective detection signal and in response to receiving more than one detection signal per trigger signal, transmit control signals to the plurality of photon routing switches causing one signal photon to be routed to the photon analyzer and one signal photon to be routed to the photon processing system.

In some embodiments in response to receiving the signal photon, the photon analyzer determines one or more characteristics of that signal photon. In various embodiments after receiving a plurality of trigger signals, the photon analyzer determines one or more characteristics of signal photons generated by each of the plurality of photon sources and ranks a quality of each of the photon sources. In some embodiments in response to receiving more than one detection signal per trigger signal, the photon analyzer transmits one or more signals causing a signal photon from a highest quality photon source to be routed to the photon processing system.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

DETAILED DESCRIPTION

Techniques disclosed herein relate generally to quantum computing applications. More specifically, techniques disclosed herein relate to photon sources that include a plurality of spatially or temporally multiplexed non-deterministic photon sources that direct photons to both a photon processing system and a photon analyzer. Results from the photon analyzer can be used to characterize photons generated by each of the plurality of photon sources and to direct the highest quality photons to the photon processing system. In additional embodiments the photon analyzer can be used to confirm entangled state parameters and to identify defective photon sources so they can be prevented from sending photons to the photon processing system. The photon sources can generate either non-entangled or entangled photons of any type. The photon processing system can be a resource state generator, a photon detection system or any other quantum computing apparatus. Various inventive embodiments are described herein, including methods, processes, systems, devices, and the like. Although the embodiments disclosed herein relate primarily to photonic-based systems, the embodiments can be used for any system that uses entangled states.

In one embodiment a plurality of spatially multiplexed non-deterministic photon sources are configured to generate photon pairs in response to a trigger signal. In each photon source, photons can be non-deterministically produced in pairs (where each pair includes a signal photon and a herald photon). During operation of the photon sources "excess" photons can be produced and sent to a photon analyzer that determines one or more characteristics of the photons and of the related photon sources.

In another embodiment the photon analyzer can analyze photons exiting a resource state generator where the photons can be non-entangled photons as well as the entangled state of two or more photons (e.g., a GHZ state, Bell pair, and the like). The analyzer can determine if the resource state generator is performing properly by analyzing the exiting photons and photon entangled states.

In order to better appreciate the features and aspects of photon and photon source characterization according to the present disclosure, further context for the disclosure is provided in the following section by discussing several particular quantum computing architectures that employ photon analyzers, according to embodiments of the present disclosure. These embodiments are for example only and other embodiments can be employed in other quantum computing architectures.

Figure 1:
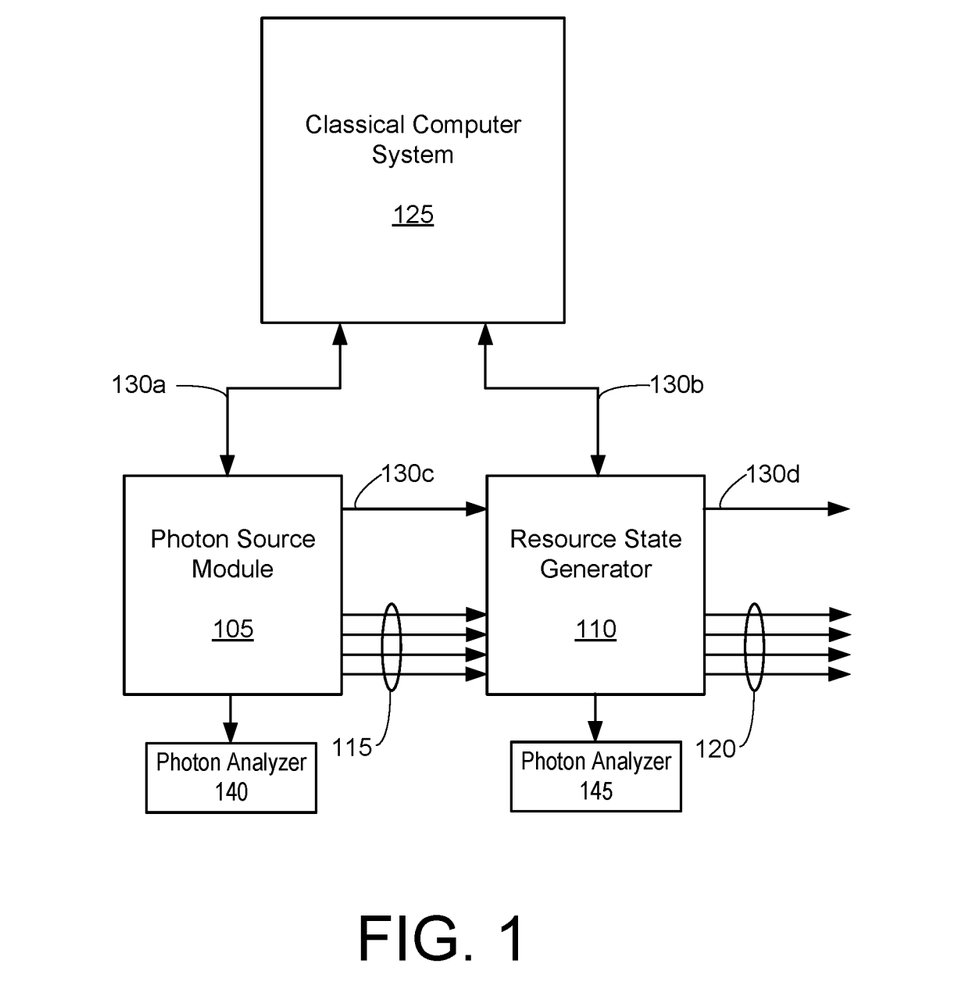
FIG. 1 illustrates a simplified schematic of a qubit entangling subsystem, according to embodiments of the disclosure.

FIG. 1 is a simplified block diagram of a qubit entangling subsystem 100 of a linear optical quantum computer (LOQC) that may use photon sources disclosed herein according to certain embodiments. Qubit entangling subsystem 100 can be used to generate qubits (e.g., photons) including multiple non-entangled photons as well as the entangled state of two or more photons (e.g., a GHZ state, Bell pair, and the like), in accordance with some embodiments. As shown in FIG. 1, qubit entangling subsystem 100 can include a photon source module 105 that is optically connected to a resource state generator 110. In one embodiment photon source module 105 can provide output photons to resource state generator 110 by way of interconnecting waveguides 115. Resource state generator 110 can receive the output photons and convert them to one or more entangled photonic states and then output these entangled photonic states into output waveguides 120 for use by a downstream circuit that can use the entangled states for further analysis. Both photon source module 105 and resource state generator 110 can be coupled to a classical computer system 125 such that classical computer system 125 can communicate with and/or control (e.g., via classical information channels 130a, 130b) photon source module 105 and/or resource state generator 110. Classical information channel 130c can communicate between photon source module 105 and resource state generator 110, and classical communication channel 130d can communicate between resource state generator 110 and downstream components.

Qubit entangling subsystem 100 can include a first photon analyzer 140 coupled to photon source module 105 and/or a second photon analyzer 145 coupled to resource state generator 110. In some embodiments photon source module 105 and/or resource state generator 110 can be non-deterministic and thus may generate excess photons and/or photon entangled states for a given generation cycle. First and second photon analyzers 140, 145, respectively, are configured to characterize these excess photons and/or photon entangled states and use the result for improvement of and/or diagnostics of qubit entangling subsystem 100. More specifically in some embodiments results from first and second photon analyzers 140, 145, respectively, can be used to select the highest quality resources within qubit entangling subsystem 100 and preferentially use those resources for future operations, to perform diagnostics on resources within the qubit entangling subsystem, to perform quantum tomography on photons and/or photon entangled states generated by photon source and/or resource state generator, to verify that entangled states generated by the photon source module and/or the resource state generator are correct or to perform other functions. One of ordinary skill would recognize many variations, modifications, and alternative uses for first and second photon analyzers 140, 145, respectively, and would recognize that a photon analyzer can include any number of appropriate photonic components such one or more photon detectors, optical filters, polarizers, birefringent elements, and the like.

Photon Source

In some embodiments photon source module 105 can be non-deterministic (also sometimes referred to as "stochastic") such that a given pump pulse may or may not produce a photon pair. In some embodiments, coherent spatial and/or temporal multiplexing of several non-deterministic sources (referred to herein as "active" multiplexing) can be used to allow the probability of having one mode become occupied during a given cycle to approach 1. One of ordinary skill will appreciate that many different active multiplexing architectures that incorporate spatial and/or temporal multiplexing are possible, some of which are described herein. For instance, active multiplexing schemes that employ log-tree, generalized Mach-Zehnder interferometers, multimode interferometers, chained sources, chained sources with dump-the-pump schemes, asymmetric multi-crystal single photon sources, or any other type of active multiplexing architecture can be used. In some embodiments, photon source module 105 can employ an active multiplexing scheme with quantum feedback control and the like. In some embodiments described below, use of multirail encoding allows the probability of a band having one mode become occupied during a given pulse cycle to approach 1 without active multiplexing.

In one example of such a source, the source is driven by a pump, e.g., a light pulse, that is coupled into an optical resonator that, through some nonlinear process (e.g., spontaneous four wave mixing, second harmonic generation, and the like) may generate zero, one, or more photons. As used herein, the term "attempt" (also called a "cycle" herein) is used to refer to the act of driving a photon source with some sort of driving signal, e.g., a pump pulse, that may produce output photons non-deterministically (i.e., in response to the driving signal, the probability that the photon source will generate one or more photons may be less than 1). In some embodiments, the apparent efficiency of the photon sources may be increased by using a plurality of single-photon sources and multiplexing the outputs of the plurality of photon sources, as described in more detail below.

The precise type of photon source used is not critical and any type of source can be used, employing any photon generating process, such as spontaneous four wave mixing (SPFW), spontaneous parametric down-conversion (SPDC), or any other process. Other classes of sources that do not necessarily require a nonlinear material can also be employed, such as those that employ atomic and/or artificial atomic systems, e.g., quantum dot sources, color centers in crystals, and the like. In some cases, sources may or may be coupled to photonic cavities, e.g., as can be the case for artificial atomic systems such as quantum dots coupled to cavities. Other types of photon sources also exist for SPWM and SPDC, such as optomechanical systems and the like. In some examples the photon sources can emit multiple photons already in an entangled state in which case resource state generator 110 may not be necessary, or alternatively may take the entangled states as input and generate even larger entangled states. More specifically, the photon sources disclosed herein can generate any combination of single photons and multiple photons in non-entangled and/or entangled states. The entangled photonic states can include, but are not limited to a bell state, a GHZ state, or more generally, an n-qubit Greenberger-Horne-Zeilinger (GHZ) state (also known as an "n-GHZ state") that is an entangled quantum state of n qubits (multiple entangled state), or any other entangled state.

In some embodiments, spatial multiplexing of several non-deterministic photon sources (also referred to as a MUX photon source) is employed. Many different spatial multiplexing architectures are possible without departing from the scope of the present disclosure. Temporal multiplexing can also be implemented instead of or in combination with spatial multiplexing. Multiplexing schemes that employ log-tree, generalized Mach-Zehnder interferometers, multimode interferometers, chained sources, chained sources with dump-the-pump schemes, asymmetric multi-crystal single photon sources, or any other type of multiplexing architecture can be used. In some embodiments, the photon source can employ a multiplexing scheme with quantum feedback control and the like.

Resource State Generator

Resource state generator 110 can receive photons and/or photon entangled states from photon source module 105 and convert them to one or more entangled photonic states and then output these entangled photonic states into output waveguides 120. The entangled photonic states can include, but are not limited to a bell state, a GHZ state, or more generally, an n-qubit Greenberger-Horne-Zeilinger (GHZ)

state (also known as an "n-GHZ state") that is an entangled quantum state of n qubits (multiple entangled state), any other photon entangled state.

In some embodiments, output waveguides 120 can be coupled to a downstream circuit that can use the entangled states for performing a quantum computation. For example, the entangled states generated by the resource state generator 110 can be used as resources for a downstream quantum optical circuit (not shown).

In some embodiments, entanglement is also a non-deterministic process so resource state generator can include one or more analyzers or muxes to generate an appropriate entangled state when needed by downstream systems. In one embodiment photon analyzer 145 can be used to verify an appropriate entangled state has been generated, as described in more detail below. In some embodiments, resource state generator 110 includes one or more controllers (e.g., which may comprise field programmable gate arrays (FPGAs), application specific integrated circuits (ASICS), or the like) that determine whether a respective stage of resource state generator 110 has succeeded, perform the switching logic described above, and output a reference signal to classical channels 130b and/or 130d to inform other components as to whether the resource state generator 110 has succeeded.

Classical Computer & Clock

In some embodiments, classical computer system 125 includes a memory, one or more processor(s), a power supply, an input/output (I/O) subsystem, and a communication bus for interconnecting these components. The processor(s) can execute modules, programs, and/or instructions stored in the memory and thereby perform processing operations. As described above, qubit entangling subsystem 100 can include classical channels 130 (e.g., classical channels 130a-130d) for interconnecting and providing classical information between components. In various embodiments, classical computing system 125 can communicate with and/or control (e.g., via the classical information channels 130a, 130b) photon source module 105 and/or resource state generator 110. It should be noted that classical channels 130a-130d need not all be the same. For example, classical channel 130a through 130d can comprise a bi-directional communication bus carrying one or more reference signals, e.g., one or more clock signals, one or more control signals, or any other signal that carries classical information, e.g., heralding signals, photon detector readout signals, and the like.

In some embodiments, a system clock signal can be provided to photon source module 105 and resource state generator 110 via an external source (not shown) or by classical computer system 125 generated via classical channels 130a and/or 130b. In some embodiments, the system clock signal provided to photon source module 105 triggers photon source module 105 to attempt to output one photon per interconnecting waveguide 115. In some embodiments, the system clock signal provided to resource state generator 110 triggers, or gates, sets of detectors in resource state generator 110 to attempt to detect photons. For example, in some embodiments, triggering a set of detectors in resource state generator 110 to attempt to detect photons includes gating the set of detectors.

It should be noted that, in some embodiments, photon source module 105 and resource state generator 110 may have internal clocks. For example, photon source module 105 may have an internal clock generated and/or used by a controller and resource state generator 110 has an internal clock generated and/or used by a separate controller. In some embodiments, the internal clock of photon source module 105 and/or resource state generator 110 are synchronized to an external clock (e.g., a system clock provided by classical computer system 125) (e.g., through a phase-locked loop). In some embodiments, any of the internal clocks may themselves be used as the system clock, (e.g., an internal clock of photon source module 105 can be distributed to other components in the system and used as the master/system clock).

Figure 2:
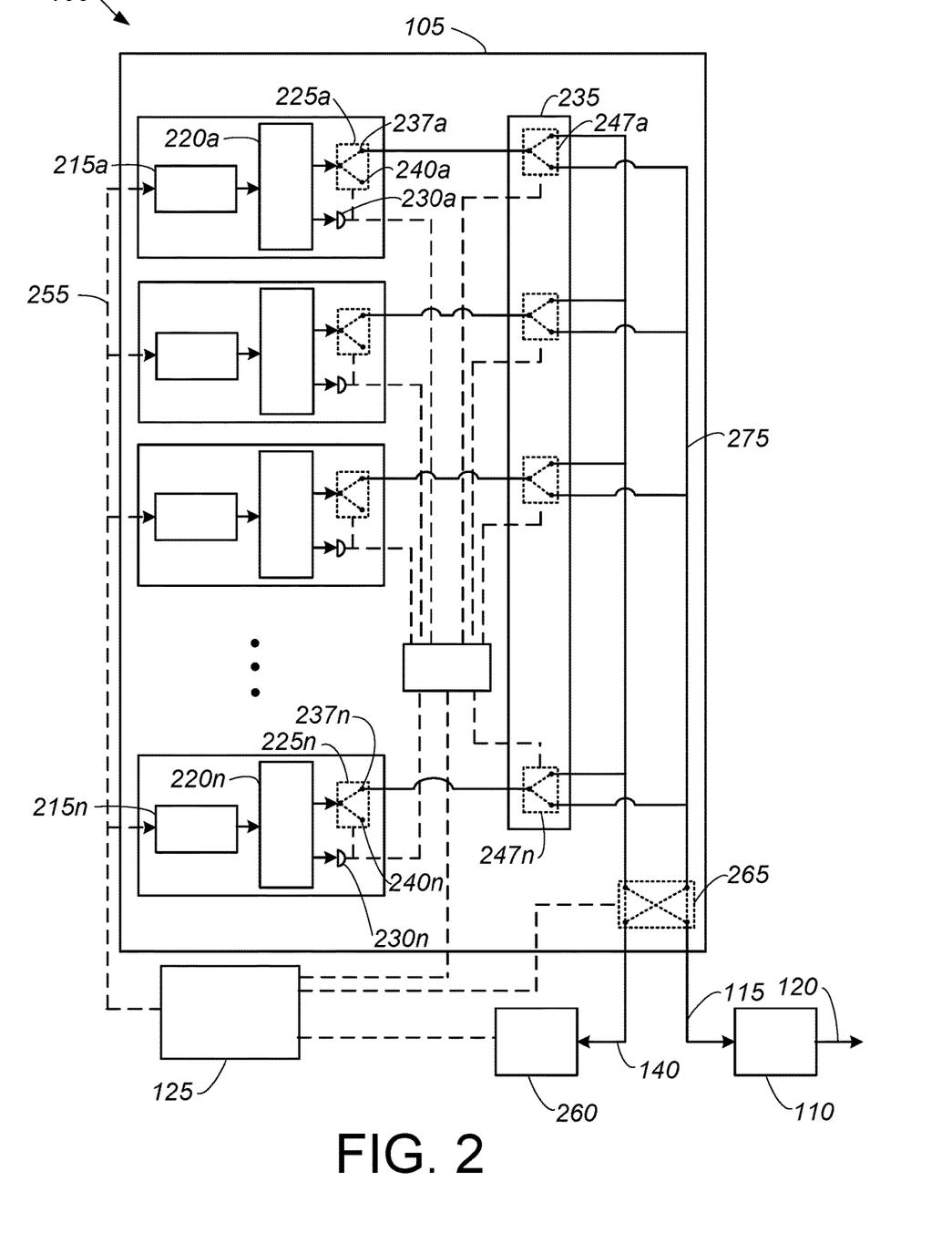
FIG. 2 illustrates simplified schematic of a qubit entangling subsystem including spatially multiplexed photon sources, according to embodiments of the disclosure.

FIG. 2 illustrates a spatially multiplexed qubit entangling subsystem 200 according to embodiments of the disclosure. As shown in FIG. 2, qubit entangling subsystem 200 can be similar to qubit entangling subsystem 100, however qubit entangling subsystem 200 includes a photon source module 205 that is configured to generate photon pairs and for simplicity, only one interconnecting waveguide 115 is shown coupling photon source module 205 to resource state generator 110 and only one output waveguide 120 is shown coupling the resource state generator to a downstream circuit. Further, greater detail is shown within photon source module 205 that includes a plurality of spatially multiplexed photon sources 215a . . . 215n, each coupled to a multiplexer 235 and configured to enable the probability of transmitting a photon out of interconnecting waveguide 115 during a given "trigger" signal 255 to approach 1.

More specifically, in this embodiment a plurality of non-deterministic photon sources 215a . . . 215n are configured to each simultaneously attempt to generate a photon pair in response to a trigger signal 255. In some embodiments trigger signal 255 can be generated by classical computer system 125 while in other embodiments a different system can generate trigger signal 255. Each photon source 215a . . . 215n can non-deterministically produce photon pairs (each of which includes a signal photon and a herald photon), where one photon (e.g., the herald photon) heralds the existence of the other photon (e.g., the signal photon) in the pair. In some embodiments the photon pairs are not entangled while in other embodiments the photon pairs are entangled and in one embodiment the photon pairs are bell state pairs. In another embodiment each photon source 215a . . . 215n can be configured to generate entangled states of two or more photons.

Each photon pair that is generated is sent to a respective splitter 220a . . . 220n that splits the signal photon from the herald photon. The signal photon is sent to a respective photon detection switch 225a . . . 225n and the herald photon is sent to a respective photon detector 230a . . . 230n. Upon detection of a herald photon by a respective detector 230, the detector generates a detection signal that can be communicated to classical computer system 125 causing the respective photon detection switch 225a . . . 225n to be configured to route the signal photon out a pass through port 237a . . . 237n to a multiplexer 235. In cases where the photon detector 230a . . . 230n does not detect a herald photon, the respective photon detection switch 225a . . . 225n can couple an output of the respective splitter 220a . . . 220n to a respective discharge port 240a . . . 240n. This same process is performed for the each of the plurality of photon sources 215a . . . 215n each time trigger signal 255 is transmitted.

In some embodiments photon detectors 230a . . . 230n can be implemented by coupling a waveguide to a single-photon detector that generates a classical signal (e.g., a digital logic signal) indicating that a photon has been detected by the detector. Any type of photodetector that has sensitivity to single photons can be used. In some embodiments, detection of a photon (e.g., at the output end of a waveguide) indicates an occupied mode while absence of a detected photon can indicate an unoccupied mode.

In some embodiments only a single signal photon is produced by plurality of photon sources 105a . . . 105n for a given trigger signal 255, and multiplexer 135 directs the signal photon to resource state generator 110 via a plurality of photon routing switches 247a . . . 247n within multiplexer 235. In other embodiments, two or more photon pairs are produced by plurality of photon sources 105a . . . 105n for given trigger signal 255 and the two or more signal photons are sent to multiplexer 135. In such cases, because only one photon is needed by resource state generator 110 there are "excess" photon(s), at least one of which can be sent to a photon analyzer 260. Any additional photons can be directed to discharge ports 240a . . . 240n. In some embodiments the sensing of the generated photons during a given trigger signal and the directing of a particular photon to resource state generator 110, the directing of a particular excess photon to analyzer 260 and the directing of any additional photons to discharge ports 240a . . . 240n can be performed by classical computer system 125.

In response to receiving signal photons, photon analyzer 260 determines one or more characteristics of the received signal photon. In some embodiments the one or more characteristics can include, but are not limited to: color, jitter, wavelength, spectral width, dispersion or delay relative to the trigger cycle that generated the received photon. Accordingly, one of ordinary skill would recognize that a photon analyzer can include any number of appropriate photonic components such one or more photon detectors, optical filters, polarizers, birefringent elements, and the like. For embodiments where photon source module 105 generates entangled states, photon analyzer 260 can analyze the entangled state to determine that the correct entangled state was generated. In further embodiments quantum tomography can be performed which can be generally described as the ability to characterize the "unknown" state and dynamics of a quantum system through physical measurements. Quantum tomography is generally performed by generating and analyzing many identical copies of the same state. A different measurement can be performed on each identical copy and the results can be used to estimate the state and dynamics of the quantum system. In one embodiment quantum tomography can be used to determine the coefficients of superposition for a wave function of an entangled state. One of skill in the art with the benefit of this disclosure will appreciate the many other photon and entangled photon characteristics that can be determined.

In some embodiments, photon analyzer 260 can determine which photon source 215a . . . 215n generated the signal photon by receiving the detection signals from detectors 230a . . . 230n. In other embodiments photon analyzer 260 can use other data to determine which photon source 215a . . . 215n generated the signal photon, including identifying a particular characteristic of the signal photon that is associated with a particular photon source. In one example, slight shifts in wavelength of each signal photon can be used to discern which photon source 215a . . . 215n generated a particular photon. In some embodiments each photon source module 105, and each resource state generator 110 can include more than one photon analyzer 260 to analyze photons generated from a multiplicity of generators.

During normal operation of photon source module 205 many photons are generated by each photon source 215a . . . 215n. This enables photon analyzer 260 to collect data on photons generated by each of the photon sources 215a . . . 215n which is indicative of the performance of each photon source. In one embodiment photon analyzer 260 ranks each photon source 215a . . . 215n according to one or more characteristics of the photons each generator generates and uses that data to rank the photon sources from highest quality to lowest quality. Using this data for future instances where more than one photon pair is generated by the plurality of photon sources 215a . . . 215n, classical computer system 125 can use data generated by photon analyzer 260 to route the highest quality signal photon to resource state generator 110 and one of the remaining signal photons to photon analyzer 260, such that metrics can be continually updated on the performance of each photon source 215a . . . 215n.

In further embodiments photon analyzer 260 can compare one or more of the characteristics of each signal photon to a threshold and detect "defective" photon sources 215a . . . 215n. In response classical computer system 125 can transmit one or more signals that prevent signal photons generated by defective photon sources to be routed to resource state generator 110. In further embodiments when defective photon sources are identified photon source module 105 can switch in a redundant photon source to take the place of the defective photon source.

In some embodiments it may be beneficial to redirect signal photons after they have been routed by multiplexer 235. This feature can enable the analysis of effects of photon routing bus 275 that extends between multiplexer 235 and resource state generator 110, or can enable photons that are generated by a high quality photon source 215a . . . 215n to be directed to photon analyzer 260 for characterization. In some embodiments the rerouting of photons can be achieved with a crossover switch 265 that is disposed between multiplexer 235 and resource state generator 110/photon analyzer 260. In various embodiments crossover switch 265 can be configured to redirect signal photons that were directed to resource state generator 110 by multiplexer 235, to photon analyzer 260, and to redirect signal photons that were directed to photon analyzer 260 by multiplexer 235, to resource state generator 110. These and other features will be described in more detail below. Although the embodiments disclosed herein relate primarily to photonic-based systems, the embodiments can be used for any system that uses entangled states.

Figure 3:
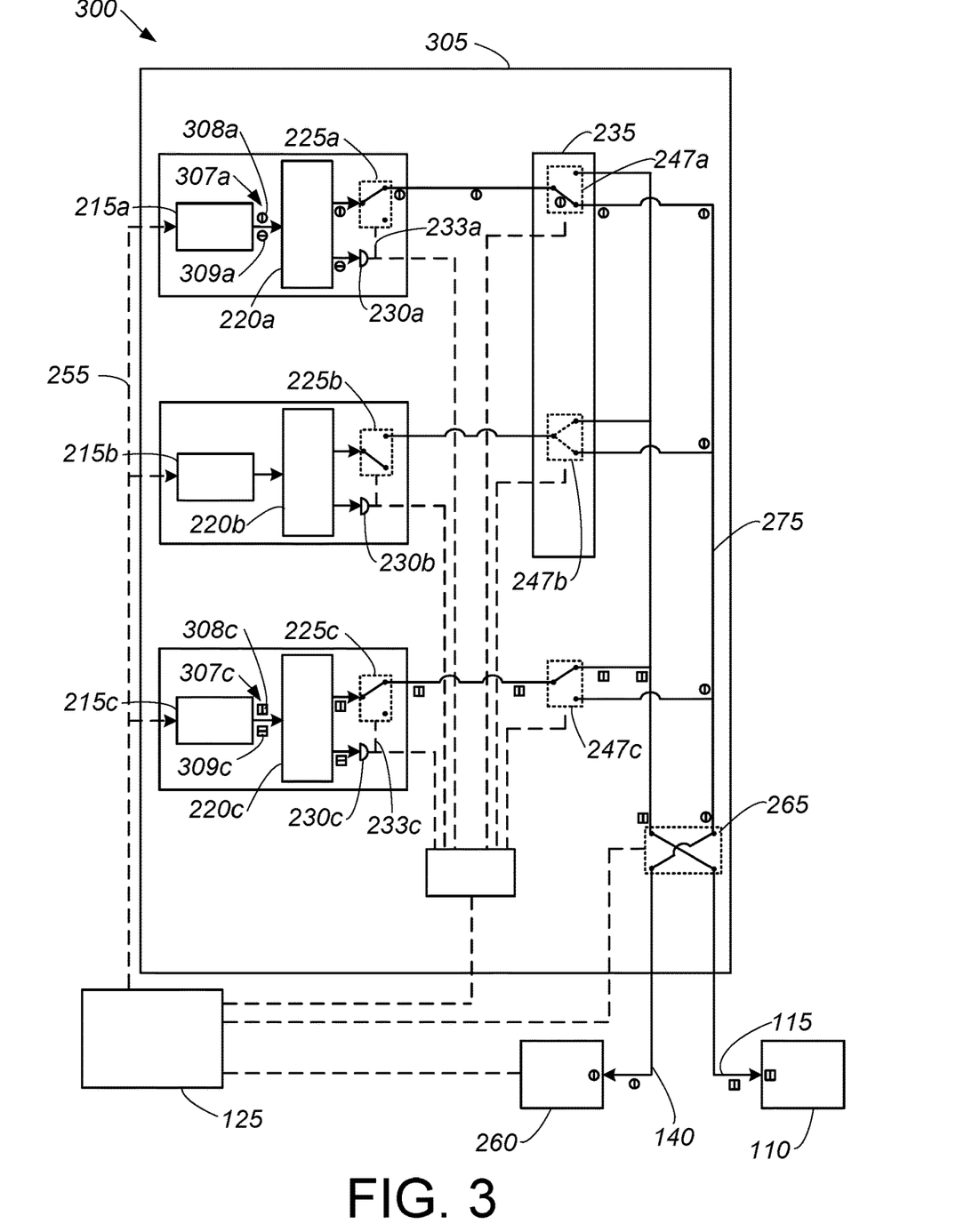
FIG. 3 illustrates simplified schematic of a qubit entangling subsystem including spatially multiplexed photon sources, according to embodiments of the disclosure.

FIG. 3 illustrates a spatially multiplexed qubit entangling subsystem 300 according to embodiments of the disclosure. As shown in FIG. 3, qubit entangling subsystem 300 can be similar to qubit entangling subsystem 200 illustrated in FIG. 2, however qubit entangling subsystem 300 includes three non-deterministic photon sources 215a . . . 215c and the paths of photon pairs generated by each respective generator are shown for one trigger signal 255.

First and third photon sources 205a and 205c, respectively generate first and third photon pairs 307a, 307c, respectively, in response to a particular trigger signal, while second photon source 205b did not generate a photon pair during this particular trigger signal. In this example, first photon pair 207a generated by first photon source 215a is illustrated by circles where a vertical line in the circle indicates a signal photon 308a of the pair and a horizontal line indicates an herald photon 309a of the pair. Similarly, third photon pair 307c for third photon source 215c is illustrated by squares where a vertical line in the square indicates a signal photon 308c of the pair and a horizontal line indicates a herald photon 309c of the pair.

As further shown in FIG. 2, first photon pair 307a is transmitted to first splitter 220a that splits the first photon pair into a first signal photon 308a and a first herald photon 309a. First herald photon 309a is transmitted to first detector 230a which transmits a first detection signal 233a to first photon detection switch 225a. In response, first photon detection switch 225a routes first signal photon 308a to first photon routing switch 247a in photon multiplexer 235. In some embodiments photon detection and routing signals can be handled by one or more internal classical computing resources, by external classical computer system 125 or a combination thereof.

As described above, second photon source 205b did not generate a photon pair during this particular trigger signal. Third photon pair 307c is transmitted to third splitter 220c that splits the third photon pair into a third signal photon 308c and a third herald photon 309c. Third herald photon 309b is transmitted to third detector 230c which transmits a third detection signal 233c to third photon detector switch 225c. In response, third photon detector switch 225c routes third signal photon 308c to third photon routing switch 247c.

Classical computer system 125 receives first and third detection signals 233a, 233c, respectively, and based on the generation of first and third photon pairs 307a, 307c, respectively, changes a state of first photon routing switch 247a and third photon routing switch 247c within multiplexer 235 to direct first signal photon 308a to resource state generator 110 and third signal photon 308c to photon analyzer 260. However, in this embodiment classical computer system 125 engages crossover switch 265 such that first signal photon 308a that was routed to resource state generator 110 by first photon routing switch 247a is now routed to photon analyzer 260. Similarly, third signal photon 308c that was routed to photon analyzer 260 by third photon routing switch 247c is now routed to resource state generator 110. In some embodiments crossover switch 265 may be useful to determine any effects of photon processing system bus 275 on photons traversing via the bus. In further embodiments that may have a small number of high quality photon sources, the photons generated by these high quality photon sources may not or may rarely be routed to photon analyzer 260. Thus, crossover switch 265 enables photons from any photon source to be routed to photon analyzer 260 to maintain continuous characterization of all photon pairs. One of skill in the art with the benefit of this disclosure will appreciate the many other uses for crossover switch 265.

Figure 4:
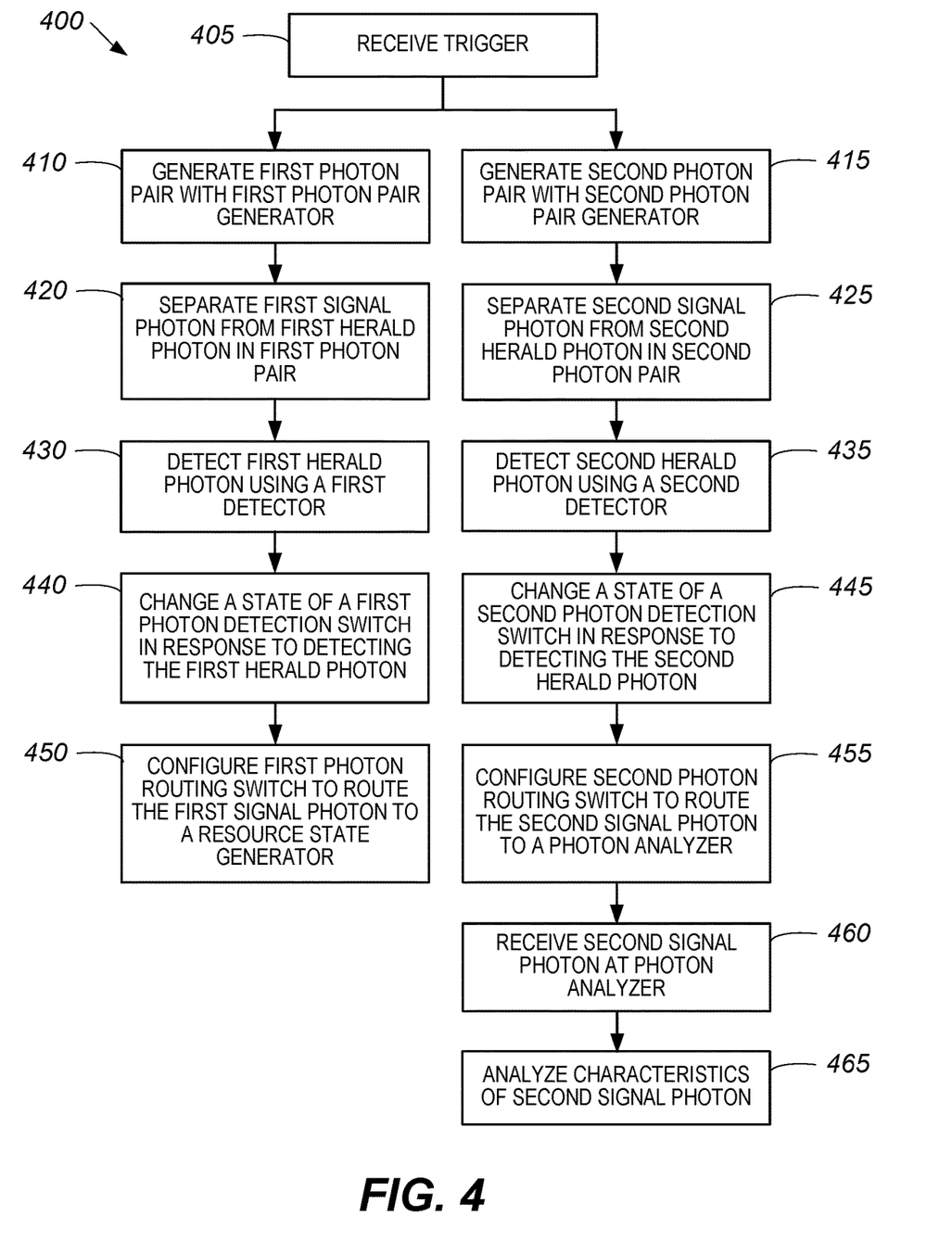
FIG. 4 illustrates a method of generating photons for a photon processing system and analyzing excess photons, according to embodiments of the disclosure.

FIG. 4 illustrates steps associated with a method 400 of generating signal photons for a resource state generator and analyzing excess photons to determine characteristics of one or more photon sources, according to some embodiments of the disclosure. As shown in FIG. 4, method 400 starts with step 405 in which a trigger signal is generated by qubit entangling subsystem. The qubit entangling subsystem may use one or more photon sources that non-deterministically produce photon pairs in response to the photon sources receiving a trigger signal. As described above, such embodiments are not limited to photon sources that produce photon pairs and the photon sources can produce any combination of non-entangled or entangled states of two or more photons.

In step 410, in response to the trigger signal, a first photon source generates a first photon pair. The first photon pair can include a first signal photon and a first herald photon. In other embodiments multiple pairs or entangled states of photons can be generated.

In step 415, in response to the trigger signal a second photon source generates a second photon pair. The second photon pair can include a second signal photon and a second herald photon. In some other embodiments multiple pairs or entangled states of photons can be generated.

In step 420, first signal photon is separated from first herald photon in first pair of photons. In one embodiment the separation can be performed with a wavelength division splitter or other suitable device. The first signal photon can be transmitted from a first splitter port and the first herald photon can be transmitted from a second splitter port.

In step 425, second signal photon is separated from second herald photon in second pair of photons. In one embodiment the separation can be performed with a wavelength division splitter or other suitable device. The second signal photon can be transmitted from a primary splitter port and the first herald photon can be transmitted from a secondary splitter port.

In step 430, first herald photon can be detected with a first detector that is coupled to second splitter port. In response to detecting the first herald photon, the first detector can transmit a first detection signal.

In step 435, second herald photon can be detected with a second detector that is coupled to secondary splitter port. In response to detecting the second herald photon, the second detector can transmit a second detection signal.

In step 440, a state of a first photon detection switch is changed to allow the first signal photon to pass through. In some embodiments the state of the first photon detection switch is changed in response to the first detection signal transmitted by the first detector.

In step 445, a state of a second photon detection switch is changed to allow the second signal photon to pass through. In some embodiments the state of the second photon detection switch is changed in response to the second detection signal transmitted by the second detector.

In step 450, a first photon routing switch is configured to route the first signal photon from the first photon detection switch to a resource state generator. In some embodiments the first photon routing switch can be configured by detection logic circuitry or by a classical computer system, as described in more detail herein.

In step 455, a second photon routing switch is configured to route the second signal photon from the second photon detection switch to a photon analyzer. In some embodiments the second photon routing switch can be configured by detection logic circuitry or by a classical computer system, as described in more detail below.

In some embodiments detection logic circuitry is configured to receive first and second detection signals and configure the first and second photon routing switches such that a single source photon is transmitted to the resource state generator in response to each trigger signal. In embodiments where only one detection signal is received the detection logic circuitry configures that corresponding photon routing switch to transmit the signal photon to the resource state generator. In embodiments where two or more detection signals are received the detection logic circuitry configures one photon routing switch to transmit a corresponding signal photon to the resource state generator and a separate signal photon to the photon analyzer. In further embodiments detection logic circuitry can operate in conjunction with data acquired by the photon analyzer to select and transmit the highest quality photon to the resource state generator, as described in more detail herein.

In step 460, second signal photon is received a photon analyzer.

In step 465, in response to receiving the second signal photon the photon analyzer determines one or more characteristics of the second signal photon. In some embodiments the one or more characteristics can include, but are not limited to: color, jitter, wavelength, spectral width, dispersion or delay relative to the clock cycle that generated the received photon. One of skill in the art with the benefit of this disclosure will appreciate the many other characteristics that can be determined. In some embodiments the photon analyzer can determine which photon source generated the signal photon by receiving the detection signals from the detectors. In other embodiments the photon analyzer can use other data to determine which photon source generated the signal photon, including identifying a particular characteristic of the signal photon that is associated with a particular photon source. In one example, slight shifts in wavelength of each signal photon can be used to discern which photon source generated a particular photon and to use that data to determine characteristics of the respective photon source. In embodiments where the photon sources generated an entangled state of two or more photons the photon analyzer can perform quantum tomography on the entangled state.

It will be appreciated that method 400 is illustrative and that variations and modifications are possible. Steps described as sequential may be executed in parallel, order of steps may be varied, and steps may be modified, combined, added or omitted. Method 400 was described and illustrated using two photon sources, however any number of and any physical layout of photon sources can be used.

Figure 5:
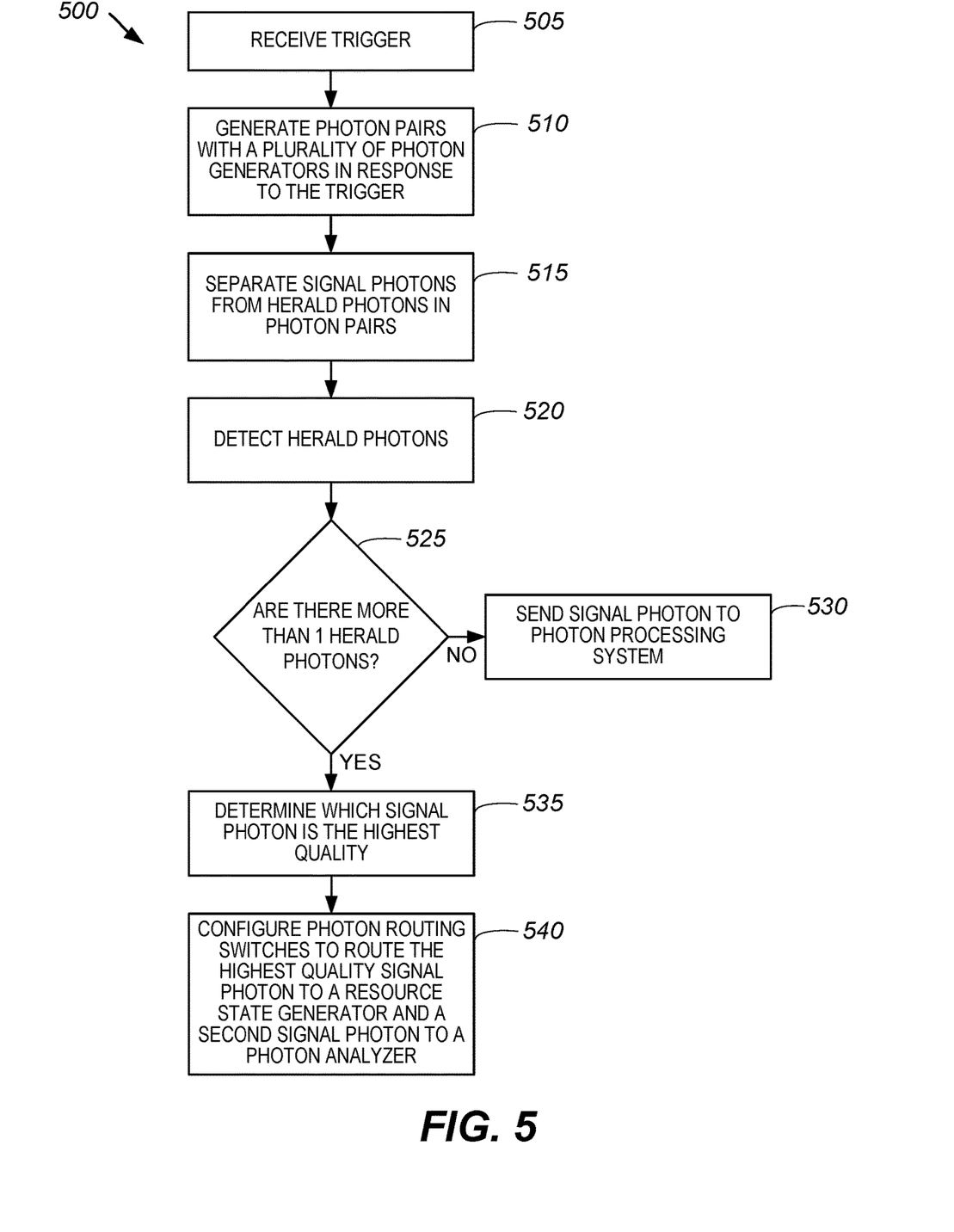
FIG. 5 is a method of generating and controlling the quality of signal photons for a photon processing system, according to some embodiments of the disclosure.

FIG. 5 illustrates steps associated with a method 500 of generating and controlling a quality of signal photons for a resource state generator, according to some embodiments of the disclosure. As shown in FIG. 5, method 500, step 505 starts with the reception of a trigger signal by one or more photon sources. In some embodiments, photon processing systems may benefit from a photon source that deterministically produces a single signal photon in response to supplying the photon source with a trigger signal.

In step 510, in response to the trigger signal a plurality of photon sources generate a plurality of photon pairs. Each photon pair can include a signal photon and an herald photon. In other embodiments multiple pairs can be generated and in further embodiments photon entangled states can be generated.

In step 515, for each photon pair generated, signal photons are separated from herald photons. In one embodiment the separation can be performed with a wavelength division splitter or other suitable device.

In step 520, herald photons for each photon pair generated can be detected with a respective detector. In response to detecting an herald photon, the respective detector can transmit a respective detection signal. In some embodiments detection logic circuitry can receive the one or more detection signals, while in other embodiments a classical computer system and receive the one or more detection signals.

In step 525, it is determined if there are more than one herald photons detected. In some embodiments detection logic circuitry can make the determination. If there is only one herald photon detected there is only one signal photon and the detection logic circuitry proceeds to step 530 and causes the signal photon to be transmitted to the resource state generator. If there are more than one herald photons detected there are more than one signal photons that were generated and the process proceeds to step 535. In step 535, the detection logic circuitry can work in conjunction with a photon analyzer to determine which signal photon has the highest quality based on previously characterized photons from each photon source. In step 540, the photon routing switches are configured to route the highest quality photon to the resource state generator and a second signal photon is routed to a photon analyzer. In this way only the highest quality signal photons are sent to the resource state generator.

It will be appreciated that method 500 is illustrative and that variations and modifications are possible. Steps described as sequential may be executed in parallel, order of steps may be varied, and steps may be modified, combined, added or omitted.

Figure 6:
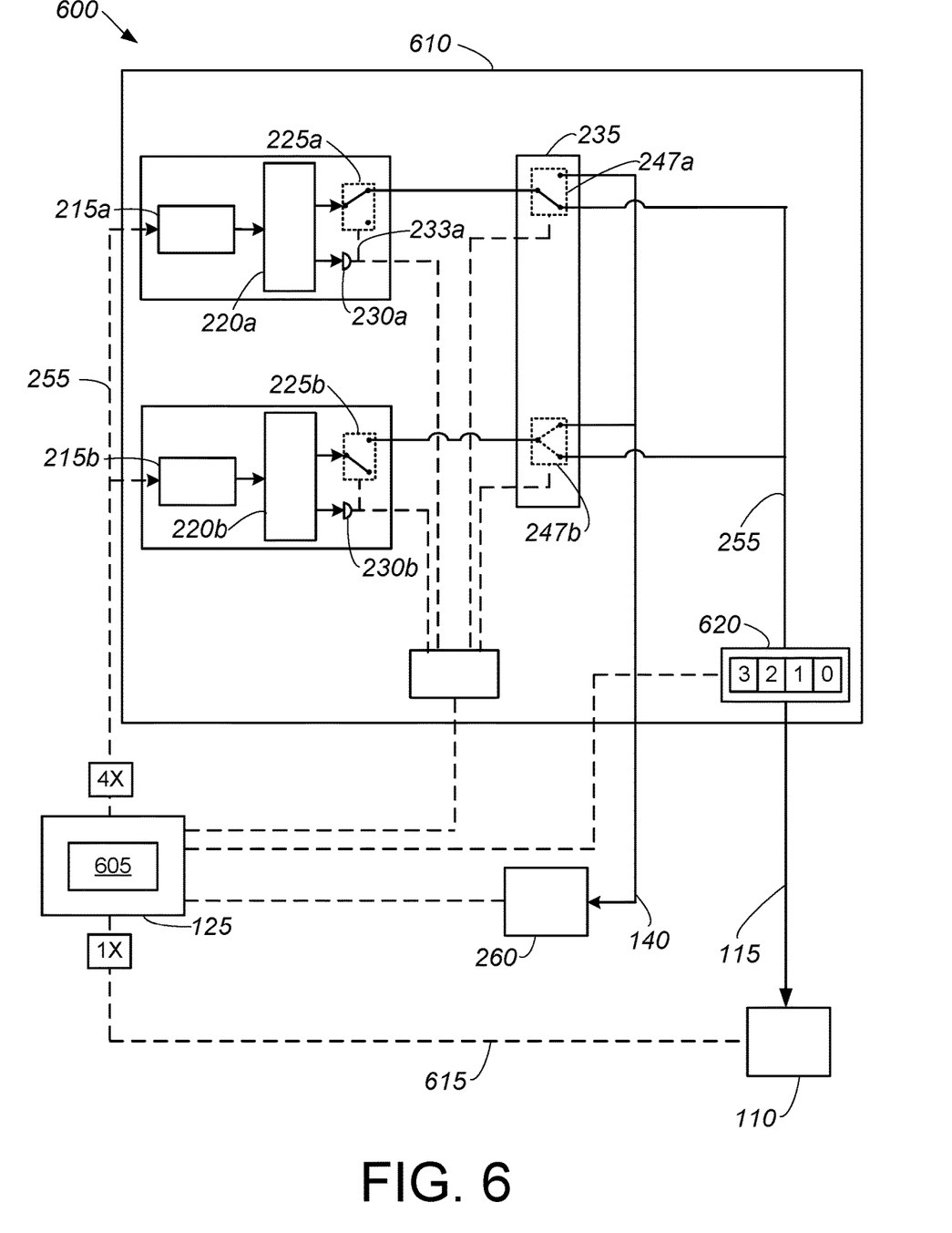
FIG. 6 is simplified schematic of a qubit entangling subsystem including temporally multiplexed photon sources, according to embodiments of the disclosure.

FIG. 6 illustrates a temporally multiplexed qubit entangling subsystem 600 according to embodiments of the disclosure. As shown in FIG. 6, qubit entangling subsystem 600 can be similar to spatially multiplexed qubit entangling subsystem 300 (illustrated in FIG. 3), however temporally multiplexed qubit entangling subsystem 600 includes two temporally multiplexed non-deterministic photon sources 215a . . . 215c that can direct generated photons to a resource state generator via a variable delay 620, as described in more detail below.

In entangling subsystem 600 of FIG. 6, classical computer system 125 includes a master clock 605 that controls the operation of photon sources 215a, 215b and the operation of resource state generator 110. More specifically, in this example embodiment resource state generator 110 needs a photon from photon source module 610 every one clock cycle which is represented by resource state generator trigger 615 with the notation "1×". Comparatively, classical computer system 125 transmits four trigger signals 255, with the notation "4×" to photon sources 215a, 215b for every one resource state generator trigger 615. That is, photon sources 215a, 215b are triggered four times as frequently as resource state generator. This four to one ratio can enable the use of fewer photon sources without a loss of photon generating opportunities. That is, every resource state generator clock cycle is fed by two photon sources operating four times each for a total of eight photon generating cycles. Comparatively, a spatially multiplexed design would need eight photon sources to have eight photon generating cycles per resource state generator clock cycle. Thus, the non-determinative nature of photon sources can be overcome by spatial and/or temporal multiplexing of photon sources. One of skill in the art with the benefit of this disclosure will appreciate the many other configurations of temporally multiplexed photon source including one photon source that can be operated numerous times (e.g., 2×, 4×, 10×, 100×, 1000×) for every resource state generator clock cycle and any other combination of photon sources and ratio of cycles.

As further illustrated in FIG. 6, multiplexer 235 is coupled to classical computer system 125 which tracks when photons are generated and directs them accordingly to resource state generator 110 and/or photon analyzer 260. In temporally multiplexed systems an added variable delay 620 can be positioned between multiplexer 235 and resource state generator, however in other embodiments other system architectures can be used to accommodate the four to one ratio. In this particular example, if on the first trigger signal 255 that is sent to photon sources, a photon is generated that photon is not needed by resource state generator 110 until the fourth clock cycle so that photon can be held in a "3 cycle" bin in variable delay 620. This will delay the photon from being sent to resource state generator 110 for the next three cycles until the fourth clock cycle. If during the first cycle a second photon is generated, classical computer system 125 can direct that photon to photon analyzer 260 via multiplexer 235. At this point, because there is already a photon waiting for the resource state generator 110, all further photons that are generated in subsequent clock cycles can be sent to photon analyzer 260.

The operation of variable delay 620 is similar if there were no photons generated in the first cycle, however one photon was generated in the second cycle. Classical computer system 125 would direct that photon to the "2 cycle" bin which would delay the photon for the next two cycles until the fourth cycle, then it would be released to resource state generator 110. Any other photons that are generated can be considered "excess" and can be sent to photon analyzer 260. A similar operation is performed if one or more photons are only generated on the third cycle and/or the fourth cycle. One of ordinary skill, with the benefit of this disclosure, would recognize many variations, modifications, and alternatives for delaying and transferring generated photons in a temporally multiplexed photon source architecture. As described herein, photon sources 215a, 215b can generate any type or combination of non-entangled or entangled photons including one, two or more photons.

Figure 7:
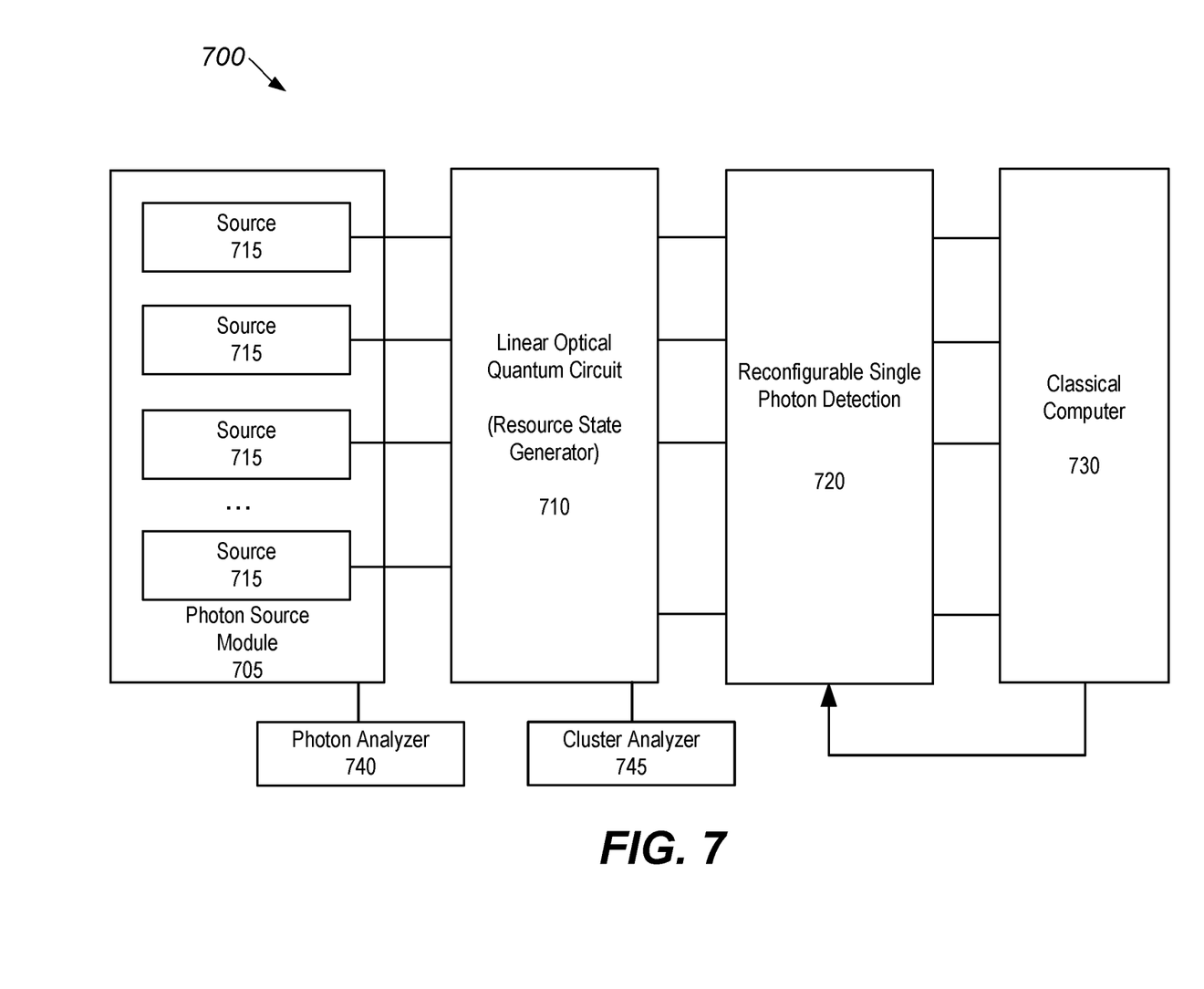
FIG. 7 illustrates a simplified block diagram of an example of a linear optical quantum computer, according to embodiments of the disclosure.

FIG. 7 is a simplified block diagram of an example of a linear optical quantum computer (LOQC) 700 that can use spatially and/or temporally multiplexed photon sources disclosed herein according to certain embodiments. LOQC 700 may include multiple photon sources 715 within a photon source module 705, a linear optical quantum computing circuit operating as a resource state generator 710, a reconfigurable single photon detection circuit 720, and a classical computer 730. Each photon source 715 may be configured to deterministically (or near deterministically) generate a sequence of photons that can be used as qubits. In some embodiments, photon source 715 may include cascaded (or multiplexed) photon sources based on, for example, spontaneous four wave mixing (SFWM) or spontaneous parametric down-conversion (SPDC) in passive nonlinear optical media. In each photon source 715, photons may be non-deterministically produced in pairs (a signal photon and a herald photon), where one photon (e.g., herald photon) heralds the existence of the other photon (e.g., signal) in the pair. Thus, if a herald photon is detected at one photon source, the corresponding signal photon can be used as the output of the photon source, while other photon sources in the cascaded (or multiplexed) photon sources of the photon source can be sent to a photon analyzer 740. However, in other embodiments photon sources 715 can be used to generate non-entangled or entangled photon entangled states of any quantity of photons and/or type, as described in more detail herein.

Photon analyzer 740 can determine one or more characteristics of each received "excess" photon and/or photon entangled state that is generated from photon source module 705. In some embodiments the one or more characteristics can include, but are not limited to: color, jitter, wavelength, spectral width, dispersion or delay relative to the clock cycle that generated the received photon. In other embodiments where photon sources generate entangled states of two or more photons, photon analyzer 740 can perform quantum tomography on the excess entangled states. One of skill in the art with the benefit of this disclosure will appreciate the many other characteristics of photons and/or the photon source that can be determined by photon analyzer 740. In some embodiments the photon analyzer can determine which photon source generated the photon and/or photon entangled state by receiving the detection signals from associated detectors. In other embodiments the photon analyzer can use other data to determine which photon source generated the photon and/or photon entangled state, including identifying a particular characteristic of the photon and/or photon entangled state that is associated with a particular photon source. In one example, slight shifts in wavelength of each signal photon can be used to discern which photon source generated a particular photon.

In some embodiments photon analyzer 740 can be used to optimize the performance of each photon source 715 by selecting photons from the highest quality photon sources and routing "excess" photons to the photon analyzer or to a termination port. In further embodiments photon analyzer 740 can determine if a photon source generated an appropriate photon entangled state by performing quantum tomography.

Resource state generator 710 may include a network of waveguides, beam splitters, phase shifters, delay lines, and other photonic components and circuits. The photonic components and circuits may be used to implement optical controlled-NOT (CNOT) gates to generate Bell states, and may also be used to implement fusion gates to generate larger entangled entangled states that may be stored in the delay lines.

Cluster analyzer 745 can be used to perform analysis on excess entangled states of photons generated by resource state generator 710. More specifically in one embodiment cluster analyzer 745 can analyze the entangled state of two or more photons to determine that the correct entangled state was generated. In further embodiments quantum tomography can be performed by generating and analyzing many identical copies of the same state. A different measurement can be performed on each identical copy and the results can be used to estimate the state and dynamics of the quantum system. In one embodiment quantum tomography can be used to determine the coefficients of superposition for a wave function of an entangled state.

Reconfigurable single photon measurement circuit 720 may include a plurality of single photon detectors configured to measure single photons (qubits) in the entangled states based on some measurement pattern, sometimes referred to as measurement masks.

Classical computer 730 may decode the results of the measured photons by single photon measurement circuit 720 and perform some logic processing to generate the computation results. In some embodiments, classical computer 730 may feedback the decoding results to single photon measurement circuit 720. For example, based on the decoding results, classical computer 730 may adjust some measurement masks or finalize some measurement masks that are not pre-determined for use by single photon measurement circuit 720.

Linear optical quantum computer (LOQC) 700 may include millions of optical components, such as couplers, resonators, single photon detectors, beam splitters, interferometers, switches, phase shifters, and delay lines. According to certain embodiments, these optical components may be fabricated as photonic integrated circuits (PICs) on a semiconductor wafer, such as silicon-photonic integrated circuits on a silicon wafer, using semiconductor processing technologies. 7

Linear optical quantum computer (LOQC) 700 may also include numerous electronic integrated circuits (EICs), including, for example, the control logic for the herald single-photon sources, switches, etc. To achieve a high performance (e.g., high speed), the interconnects between the electronic circuits and the photonic integrated circuits may need to be minimized. In addition, many components of LOQC 700 may need to operate at cryogenic temperatures, such as below 140 K or below 5 K, in order to achieve the desired performance.

In some embodiments, the qubits that are typically described as photons herein can be a collection of quantum systems and/or particles and can be formed using any qubit architecture. For example, the quantum systems can be particles such as atoms, ions, nuclei, and/or photons. In other examples, the quantum systems can be other engineered quantum systems such as flux qubits, phase qubits, or charge qubits (e.g., formed from a superconducting Josephson junction), topological qubits (e.g., majorana fermions), or spin qubits formed from vacancy centers (e.g., nitrogen vacancies in diamond). Furthermore, for the sake of clarity of description, the term "qubit" is used herein although the system can also employ quantum information carriers that encode information in a manner that is not necessarily associated with a binary bit. For example, qudits (i.e., quantum systems that can encode information in more than two quantum states) can be used in accordance with some embodiments.

It will be apparent to those skilled in the art that substantial variations may be made in accordance with specific implementations. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, compact disc read-only memory (CD-ROM) or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A device comprising:
   a first photon source configured to generate first photon pairs, each first photon pair including a first signal photon and a first herald photon;
   a second photon source configured to generate second photon pairs, each second photon pair including a second signal photon and a second herald photon;
   a first detector configured to generate a first detection signal in response to detecting the first herald photon;
   a second detector configured to generate a second detection signal in response to detecting the second herald photon; and
   detection logic circuitry configured to direct one of the first or the second signal photons to a photon analyzer and one of the first or the second signal photons to a photon processing system in response to the detection logic circuitry receiving the first and the second detection signals.

2. The device of claim 1 further comprising a multiplexer that routes the one of the first or the second signal photons to the photon analyzer and the one of the first or the second signal photons to the photon processing system in response to receiving one or more signals from the detection logic circuitry.

3. The device of claim 1 wherein the detection logic circuitry directs the first and the second signal photons based on a quality level of each of the first and the second signal photons.

4. The device of claim 1 wherein in response to receiving the first or the second signal photon, the photon analyzer determines one or more characteristics of the received signal photon.

5. The device of claim 4 wherein the one or more characteristics include color, jitter, wavelength, spectral width or dispersion.

6. The device of claim 1 wherein during repetitive operation of the first and the second photon sources, the photon analyzer determines one or more characteristics of first signal photons generated by the first photon source and one or more characteristics of second signal photons generated by the second photon source.

7. The device of claim 6 wherein the photon analyzer compares one or more characteristics of the first signal photons with one or more characteristics of the second signal photons.

8. The device of claim 7 wherein in response to the comparing, the photon analyzer transmits instructions causing the photon processing system to receive more first signal photons than second signal photons.

9. The device of claim 2 further comprising a crossover switch that redirects signal photons routed to the photon analyzer by the multiplexer to the photon processing system.

10. A method of generating photons, the method comprising:
    generating a first photon pair with a first photon source, the first photon pair including a first signal photon and a first herald photon;
    generating a second photon pair with a second photon source, the second photon pair including a second signal photon and a second herald photon;
    generating a first detection signal in response to detecting the first herald photon;

generating a second detection signal in response to detecting the second herald photon; and routing one of the first or the second signal photons to a photon analyzer and one of the first or the second signal photons to a photon processing system in response to detection logic circuitry receiving the first and the second detection signals.

11. The method of claim 10 wherein the routing is performed by a multiplexer that is controlled by the detection logic circuitry.

12. The method of claim 11 wherein the detection logic circuitry directs the multiplexer to route first and the second signal photons based on a quality level of each of the first and the second signal photons.

13. The method of claim 10 wherein in response to receiving first or the second signal photon, the photon analyzer determines one or more characteristics of the received signal photon.

14. The method of claim 13 wherein the one or more characteristics include color, jitter, wavelength, spectral width or dispersion.

15. The method of claim 14 wherein during repetitive operation of the first and the second photon sources, the photon analyzer determines one or more characteristics of the first signal photon and one or more characteristics of the second signal photon.

16. The method of claim 15 wherein in response to the determining one or more characteristics of the first and the second signal photons, the photon analyzer transmits instructions causing the photon processing system to receive more first signal photons than second signal photons.

17. A photon source comprising:
a plurality of photon sources, each configured to non-deterministically generate a photon pair in response to receiving a trigger signal, wherein each photon pair includes a signal photon and an herald photon;

a plurality of photon detectors, each coupled to a respective photon source of the plurality of photon sources and configured to generate a respective detection signal upon detecting the herald photon of each generated photon pair;

a plurality of photon routing switches, each coupled to a respective photon source and configured to direct the respective signal photons to a photon processing system or to a photon analyzer; and a photon detection logic circuit configured to receive each respective detection signal and in response to receiving more than one detection signal per trigger signal, transmit control signals to the plurality of photon routing switches causing one signal photon to be routed to the photon analyzer and one signal photon to be routed to the photon processing system.

18. The photon source of claim 17 wherein in response to receiving the signal photon, the photon analyzer determines one or more characteristics of that signal photon.

19. The photon source of claim 18 wherein after receiving a plurality of trigger signals, the photon analyzer determines one or more characteristics of signal photons generated by each of the plurality of photon sources and ranks a quality of each of the plurality of photon sources.

20. The photon source of claim 19 wherein, in response to receiving more than one detection signal per trigger signal, the photon analyzer transmits one or more signals causing a signal photon from a highest quality photon source to be routed to the photon processing system.

* * * * *